(12) United States Patent
Song et al.

(10) Patent No.: US 11,009,246 B2
(45) Date of Patent: May 18, 2021

(54) SYSTEMS AND METHODS TO DETECT DIRT LEVEL OF FILTERS

(71) Applicant: Siemens Industry, Inc., Alpharetta, GA (US)

(72) Inventors: Zhen Song, Austin, TX (US); Gregory Conte, Gulf Breeze, FL (US); Qinpeng Wang, Chicago, IL (US)

(73) Assignee: Siemens Industry, Inc., Alpharetta, GA (US)

( * ) Notice: Subject to any disclaimer, the term of this patent is extended or adjusted under 35 U.S.C. 154(b) by 82 days.

(21) Appl. No.: 16/555,978

(22) Filed: Aug. 29, 2019

(65) Prior Publication Data

US 2021/0063038 A1    Mar. 4, 2021

(51) Int. Cl.
  *F24F 11/39*   (2018.01)
  *G05B 15/02*   (2006.01)

(52) U.S. Cl.
  CPC .............. *F24F 11/39* (2018.01); *G05B 15/02* (2013.01)

(58) Field of Classification Search
  CPC .................................. F24F 11/39; G05B 15/02
  See application file for complete search history.

(56) References Cited

U.S. PATENT DOCUMENTS

| | | | |
|---|---|---|---|
| 5,707,005 A | 1/1998 | Kettler et al. | |
| 7,261,762 B2 | 8/2007 | Kang et al. | |
| 8,328,905 B2 * | 12/2012 | Matsuzaki | B01D 46/0086 95/25 |
| 9,546,942 B2 | 1/2017 | ter Horst et al. | |
| 10,188,976 B2 * | 1/2019 | Cho | G06F 17/00 |
| 2004/0217872 A1 * | 11/2004 | Bhardwaj | B01D 35/143 340/607 |
| 2007/0146148 A1 * | 6/2007 | Kawasaki | B01D 46/0086 340/607 |
| 2011/0023709 A1 | 2/2011 | Bosshard | |
| 2011/0197761 A1 * | 8/2011 | Matsuzaki | B01D 46/0086 95/25 |
| 2012/0319851 A1 | 12/2012 | Hoglund et al. | |
| 2015/0330650 A1 | 11/2015 | Abiprojo et al. | |
| 2015/0330857 A1 | 11/2015 | Henderson et al. | |
| 2016/0045854 A1 | 2/2016 | Hung et al. | |
| 2016/0342957 A1 | 11/2016 | Sloup | |
| 2017/0189846 A1 * | 7/2017 | Cho | B01D 46/444 |

FOREIGN PATENT DOCUMENTS

| | | |
|---|---|---|
| EP | 3489592 | 5/2019 |
| WO | 2015175821 A1 | 11/2015 |
| WO | 2018040618 A1 | 3/2018 |

(Continued)

OTHER PUBLICATIONS

Alsaleem, Fadi M., "Current Based HVAC Systems Air Filter Diagnostics and Monitoring", International High Performance Buildings Conference, Paper 178, 2016, 10 pages.

(Continued)

*Primary Examiner* — Sisay Yacob (57) ABSTRACT

An approach that collects sensor data associated with a building automation system having filters and determining the optimal timing of the replacement of filters that includes replacement dates based upon use, utility, and labor costs.

21 Claims, 12 Drawing Sheets

(56) References Cited

FOREIGN PATENT DOCUMENTS

WO    2019010603 A1    1/2019

OTHER PUBLICATIONS

Alsaleem, Fadi M., "HVAC System Cloud Based Diagnostics Model", International Refrigeration and Air Conditioning Conference, Paper 1508, 2014, 10 pages.
Nederman S.E.A. Co, LTD, NF3000 Filter, product literature, www.nederman.com, 16 pages.
PCT Search Report dated Nov. 3, 2020, for PCT Application No. PCT/US2020/047087, 13 pages.

* cited by examiner

SYSTEMS AND METHODS TO DETECT DIRT LEVEL OF FILTERS

TECHNICAL FIELD

The present invention relates generally to filters and more particularly to the efficiency and life of a filter.

BACKGROUND

In commercial buildings, the Air Handling Unit (AHU) or Roof Top Unit (RTU) air filters should be replaced properly. Too soon replacements will end up extra hardware and labor costs. Too few replacements result in increased energy expenses and may compromise the health of the occupants.

In standard practices, engineers blindly replace the filters on a fixed schedule, such as every 3 months without checking the real dirty level. This method is not accurate. Depending on the outdoor air quality (OAQ) and indoor air quality (IAQ) conditions, and the supply fan status, the dirty level may increase faster or slower. Thus, once again either extra equipment/labor costs are incurred or higher energy expenses.

Another known practice is to replace the filters when the differential pressure (DP) reaches a threshold. But, this method is not reliable due to the sensor data noises that are inherent in sensors. As the prefilter DP value changes significantly due to abnormal and/or noisy sensor readings signaling a dirty filter and making the readings untrustable. Similar problems exist with other medium or material filtering, such as water, oil, etc.

What is needed is a way to determine with a filter is dirty and in need of replacing while avoiding either replacing the filter too soon/often or running a system with a filter in need to replacing.

SUMMARY

An approach and system are described for using a plurality of sensors that monitor the efficiency of the dirty side or input of a filter and the output side of a filter. The sensor data is then collected, averaged or otherwise normalized creating a filter curve over time. The filter curve is then further processed to predict when a threshold will be reached requiring the filter to be replaced. A date for the filter replacement is determined. The date of filter replacement is also based upon the cost of the filter and labor cost needed to replace the filter. The filter may be an air filter, water filter, or other types of material filters where differential pressure between the different sides of the filter.

Other devices, apparatus, systems, methods, features, and advantages of the invention will be or will become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE DRAWINGS

The invention can be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

An approach and system are described for using a plurality of sensors that monitor the efficiency of the dirty side or input of a filter and the output side of a filter.

Figure 1:
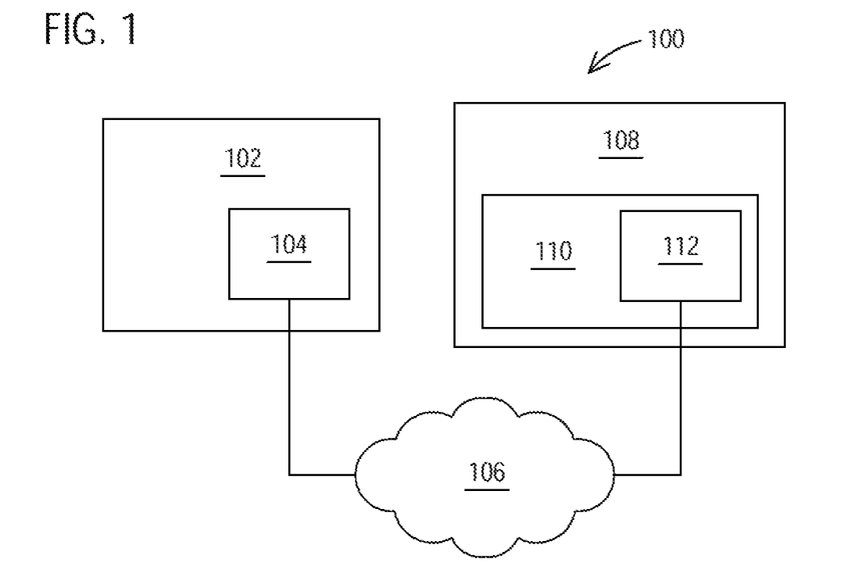
FIG. 1 is a diagram of a first building having a master building controller coupled to a network and a second building with a building automation system in accordance with an example implementation of the invention.

In FIG. 1, a diagram 100 of a network center building 102 having a master building controller 104 coupled to a network 106 and a building 108 with a building automation system 110 is depicted in accordance with an example implementation of the invention. The building automation system 110 has a controller 112 connected to a network 106. The building automation system 110, such as offered by SIEMENS CORPORATION. The controller 112 may be a dedicated computer running an operating system such as LINUX or WINDOWS. The network connection may be a wired Ethernet, wireless Ethernet, cellular, packet data, ISDN, or other types of network connection that is able to provide data for transport via a network. The master building controller 104 is shown in building 102, but in practice may be located as software being executed on a server that is located in a server farm accessed via the internet in a manner commonly referred to as cloud computing.

Figure 2:
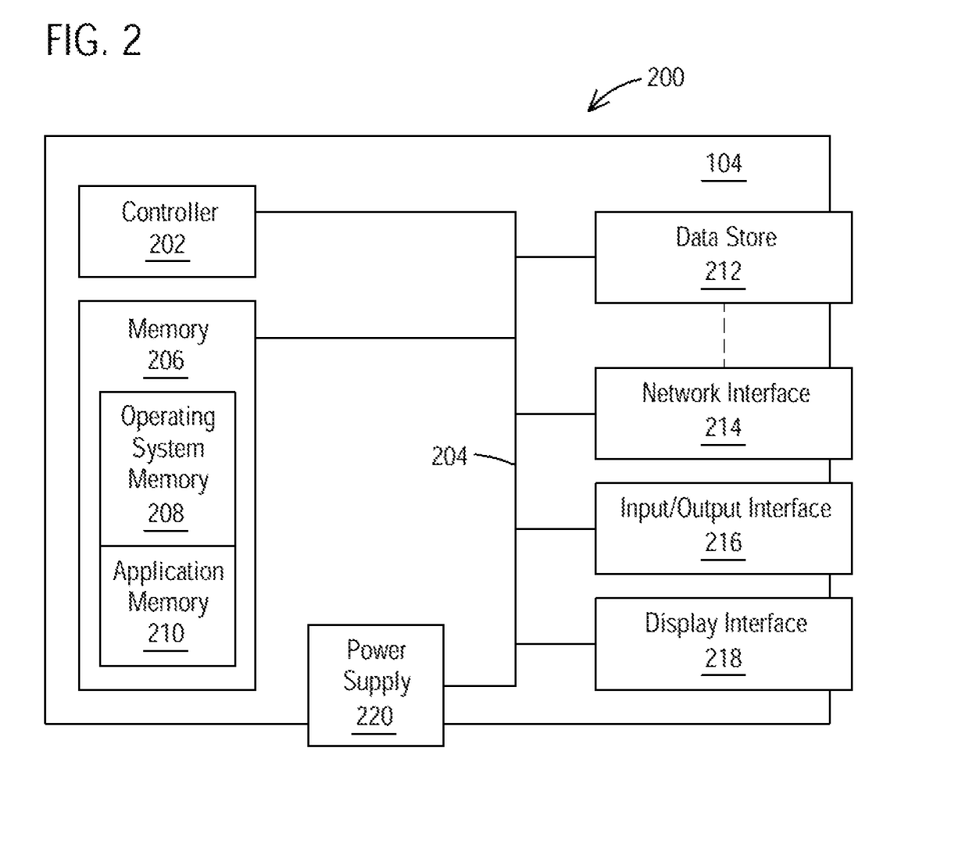
FIG. 2 is a diagram of the building controller of FIG. 1 in accordance with an example implementation of the invention.

FIG. 2 is a diagram 200 of a master building controller 104 of FIG. 1 in accordance with an example implementation of the invention. The master building controller 104 has a controller/processor 202 coupled to a memory 206, data store 212, network interface 214, input/output interface 216, display interface 218, and power supply 220, all connected via bus 204. The bus 204 is shown as a power/data bus, but in practice, the master building controller 104 may have a plurality of separate buses including data, address, and power. The memory 206 is divided into an operating system memory 208 and application memory 210. The application memory 210 contains instructions, when executed, for storing filter data in the data store 212 and processing the data to determine if a filter needs to be replaced and the date for the filter replacement. The data store 212 is depicted as being within the master building controller 104, but in other implementation, the data store 212 may reside externally or even in the network 106 or cloud. Also, in some implementations, the master building controller 104 may be implemented in the building with the building automation system 110.

Figure 3:
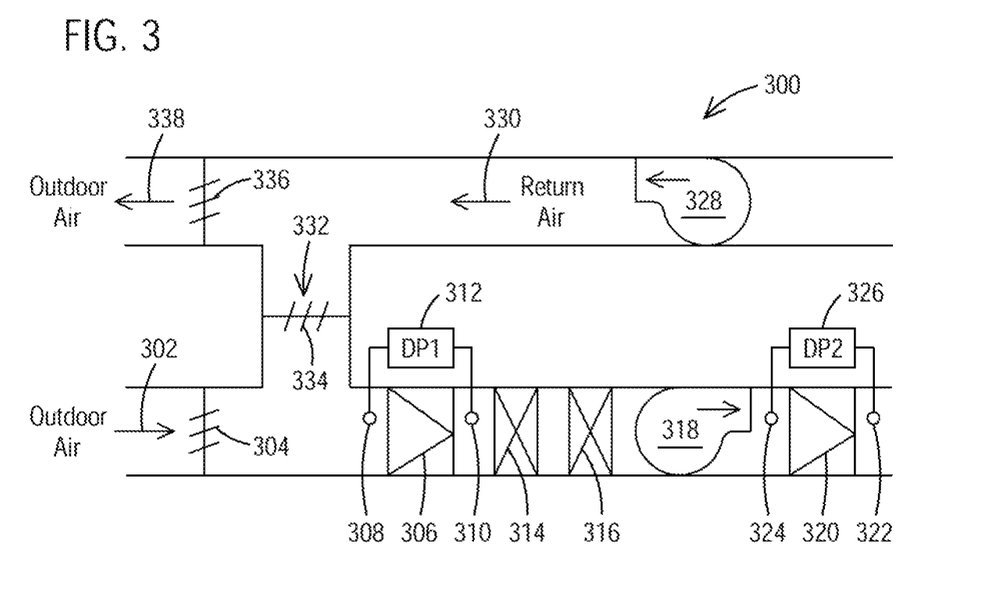
FIG. 3 is a diagram of an airflow system that is part of the building automation system of the building of FIG. 1 in accordance with an example implementation of the invention.

In FIG. 3, a diagram of an airflow system 300 that is part of the building automation system 110 of the building 108 of FIG. 1 is depicted in accordance with an example implementation of the invention. Outdoor/outside air 302 enters the building 108 and passes through damper 304. A pressure sensor 308 measures the flow or pressure of the air entering a physical filter, such as air filter 306. The flow or pressure of air leaving the filter is measured by pressure sensor 310. It is understood that the pressure sensor and flow sensor are being used interchangeably. The drop in pressure determined at the DP1 sub-controller 312 is determined and periodically sampled (differential pressure sensor data). It is noted that other implementations may have any number of differential pressure sensors. The resulting data is sent to a data store for further processing, DP1 is a sub-controller connected to the building controller. The air filter 306 may be pleated fiberglass filter in the current implementation. In other implementations, other types of filters and filter material may be used.

The airflow from air filter 306 passes through air coolers 314 and 316. A centrifugal fan 318 that increases the air pressure or flow past pressure sensor 324 and then through air filter 320 and pressure sensor 322. The differential pressure DP2 sub-controller 326 determines the pressure drop across the air filter and periodically provides the data to the data store for further processing. Additional data is generated by sensors associated with the centrifugal fan, such as the current draw and fan speed and also stored in the data store. Another centrifugal fan 328 increases the return air 330 flow or pressure. Part of the return air 332 flows through damper 334. The other part of the return air 338 is exhausted from the building 108 via air damper 336.

Figure 4:
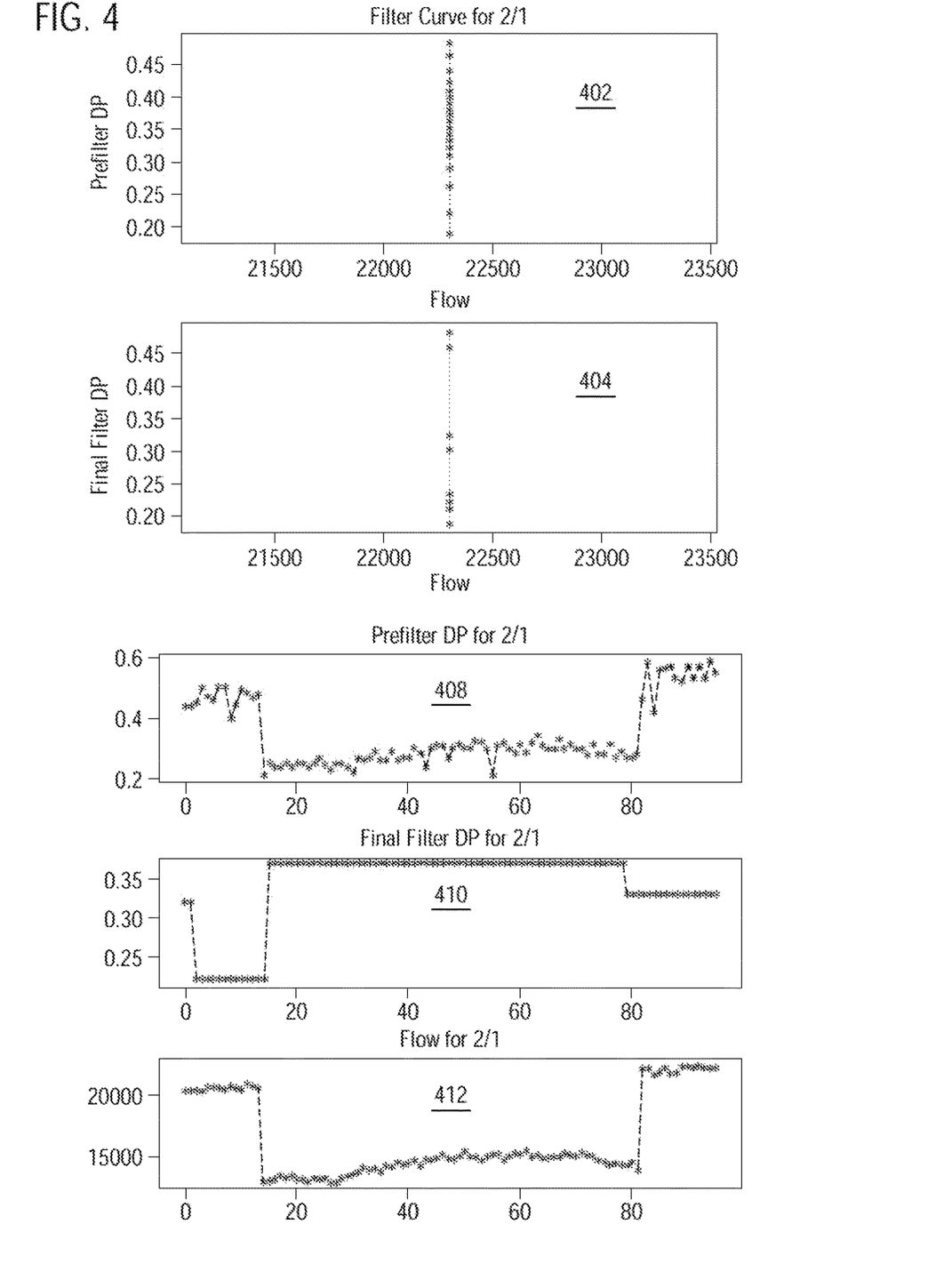
FIG. 4 are graphs of the data from input sensors monitoring the airflow system of FIG. 3 in accordance with an example implementation of the invention.

Turning to FIG. 4, graphs 402, 404, 406, 408, 410 and 412 of the data (predetermined set or period of data) from input sensors 306, 308, 322, and 324 monitoring the airflow system 300 of FIG. 3 are depicted in accordance with an example implementation of the invention. As shown in graph 408, the prefilter differential pressure (DP) value as measured at the DP1 sub-controller 312 changes significantly in one day. In the figures, the x-axis is the sample number. The sampling rate of the data at the DP1 sub-controller 312 in the current implementation is 15 minutes, but in other implementations, a different duration may be used. The duration is one day in the current implementation, but in other implementations, other durations may be used. In addition, there are events with abnormal and/or noisy sensor readings, as shown in graph 408, where the prefilter DP has different values when the flow 412 is constant. The DP increase of the flow results in an increase in the filter curve. However, the graphs 402 and 404 are measured filter curves that are vertical lines during the abnormal and/or noisy period. These abnormal and/or noisy periods may be due to failures, maintenance, abnormal, and noisy events and need to be identified and considered during the dirty level detection. Otherwise, the result will not be trustable as often occurs in prior known approaches. The theoretical filter curve is shown in graph 412, where the filter curves are plotted on a DP-Flow graph. Using DP only for dirty level estimation is not accurate due to the fundamental physics: we need to have at least DP and flow meter together to estimate the dirt level of a filter. Additionally, the analysis of the data indicates that we need to aggregate data from multiple days in order to remove noises in the sensor data when processing the data. It is noted that in other example implementations, postfilter, or other filters may be used.

Figure 5:
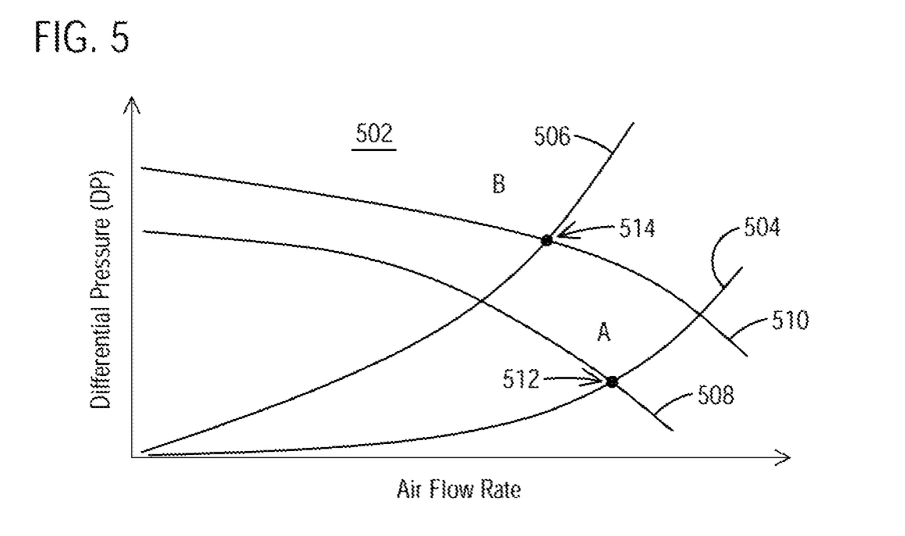
FIG. 5 is a graph of the filter curves of the processed data from the system of FIG. 3 in accordance with an example implementation.

In FIG. 5, a graph 502 of the filter curves 504-510 of the processed data from the airflow system 300 of FIG. 3 is depicted in accordance with an example implementation. Sensor data is gathered from centrifugal fan 318 and DP2 sub-controller 326. It is noted that in other implementations more or less differential pressure sensors may be employed in other HVAC systems. When processed over a predetermined time at the master building controller 104 of FIG. 1, the data for the graph of FIG. 5 results. Curve 504 shows that as the airflow rate increases the fan pressure from the centrifugal fan 318 rises (normalized values of the differential pressure), commonly referred to a system curve. As a filter gets dirty, the system curve 506 has moved up showing that the airflow rate is reduced as the fan pressure rises. With a clean filter, the fan speed curve 508 for the centrifugal fan 318 is lower as compared to the fan speed with a dirty filter.

Where the system curve 504 and fan curve with the centrifugal fan 318 at a first speed 508 crosses or meet, an operational state for clean air filters is identifiable (point "A" 512). Similarly, the system curve 506 and fan curve with a dirty filter air filter speed 510 cross or meet at an operational state for a dirty air filter is identifiable (point "B" 514). An initial point may be identified in the building automation system 110 that takes into consideration the filter material and environmental conditions such as smog. Over time during the operation of the building automation system, the operation state of the dirty air filter can be modified to more accurately signal when the filter has to be changed. Such signaling is typically an alert message or alarm being generated by the building automation system 110. More sensor data from other sensors may be employed in other implementations and combined with or used in place of the fan speed and airflow rate.

Figure 6:
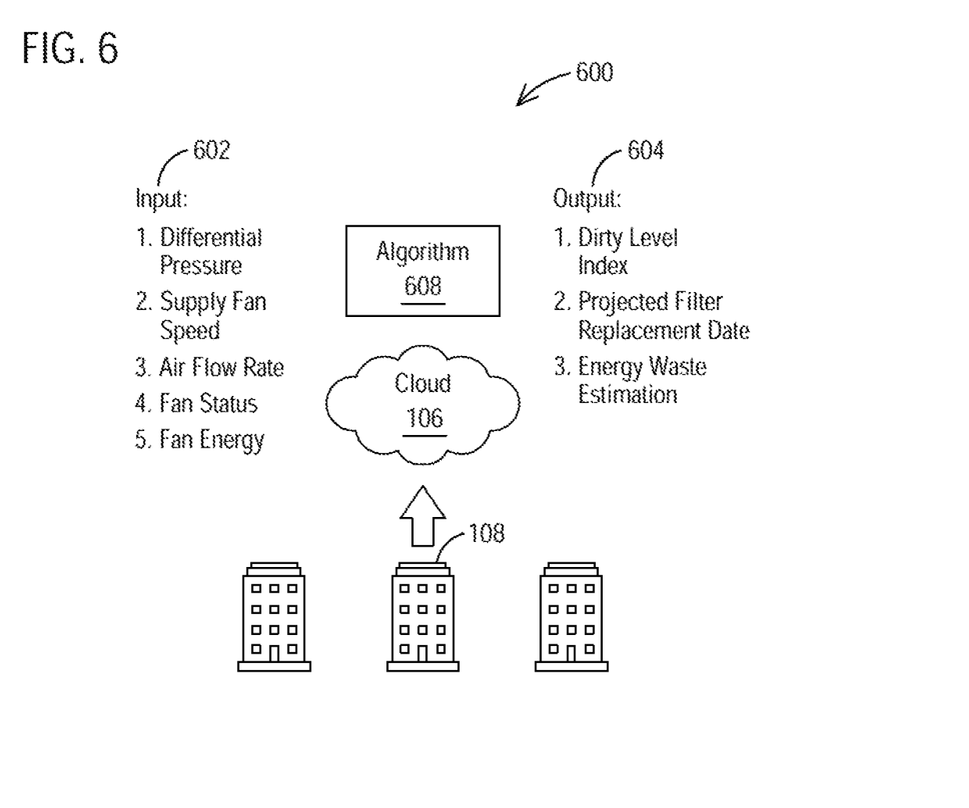
FIG. 6 is a diagram representing examples of the different types of sensor data that may be collected and processed from the elements of the system of FIG. 3 in accordance with an example implementation of the invention.

In FIG. 6, a diagram 600 representing examples of the different types of input sensor data 602 that may be collected and processed from the elements of the airflow system 300 of FIG. 3 is illustrated in accordance with an example implementation of the invention. Some examples of the input sensor data 602 include differential pressure, supply fan speed, airflow rate, fan status, and fan energy (energy sensor data). In other implementations, additional or different combinations of sensor data associated with air pressure/airflow may be employed. In yet other implementations, the sensors may be associated with a different type of media that is being filtered, such as liquids (water, oil, chemicals) being filtered with a liquid filter (filter made for filtering a liquid). The input sensor data original at the building automation system 110 FIG. 1 and is transmitted via the network 106 to the master building controller 104. The input sensor data 602 is then processed using algorithms 608 to generate output 604, such as dirty level index, projected filter replacement date, and energy waste estimation.

Figure 7:
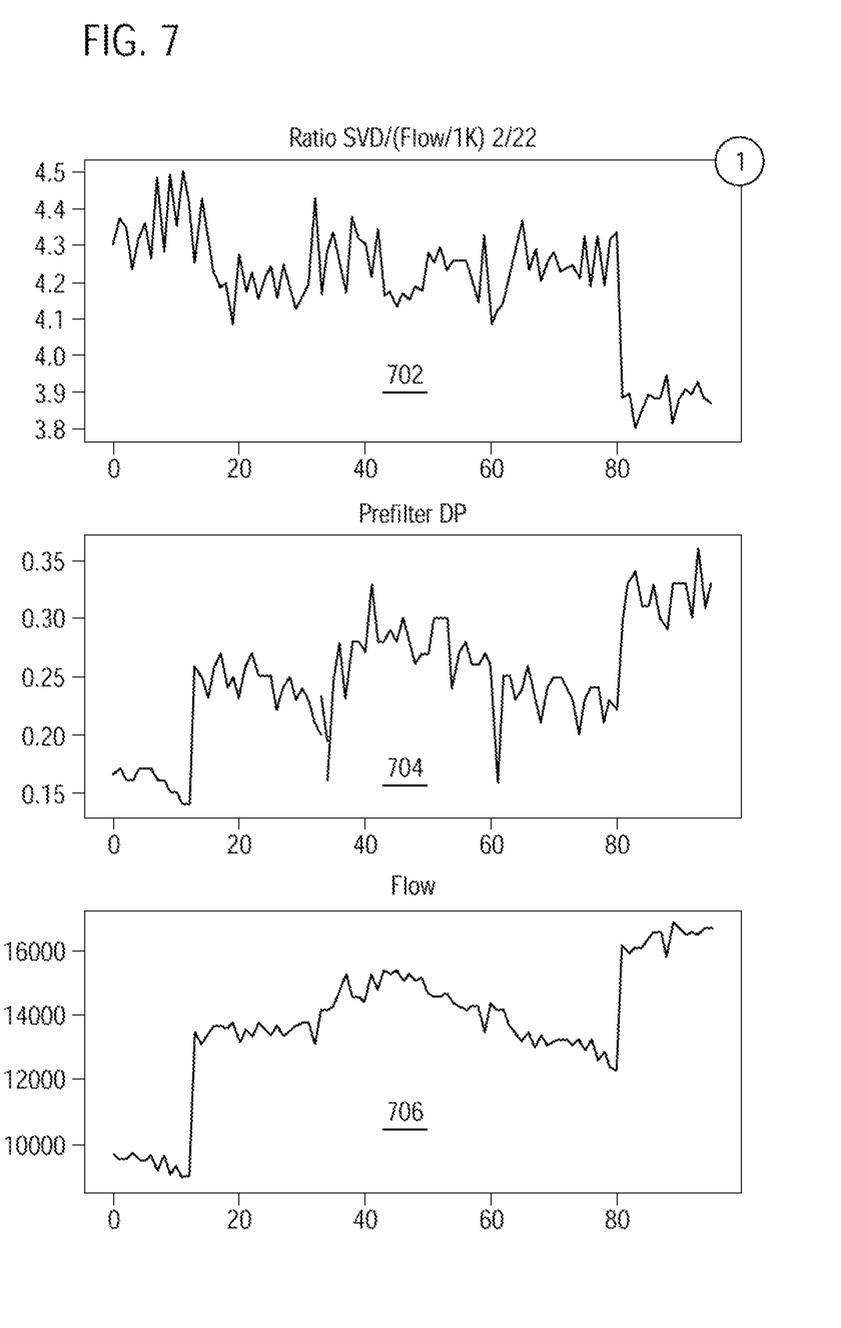
FIG. 7 is a graph of the cleaned sensor data from the DP and flow rates from FIG. 3 in accordance with an example implementation.

Turning to FIG. 7, a graph of the cleaned sensor data from the DP2 sub-controller 326 and flow rates from FIG. 3 is depicted in accordance with an example implementation. The processing starts with the raw input data (for one day in the current example) for the ratio of supply fan variable drive (svd)/flow 702 (svd provided from a sensor located in fan 318), prefilter DP 704, and flow 706. Since the DP2 sub-controller 326 sensor values change significantly along the time, as explained previously, it is not reliable to detect the dirty level based on the DP reading alone.

Figure 8:
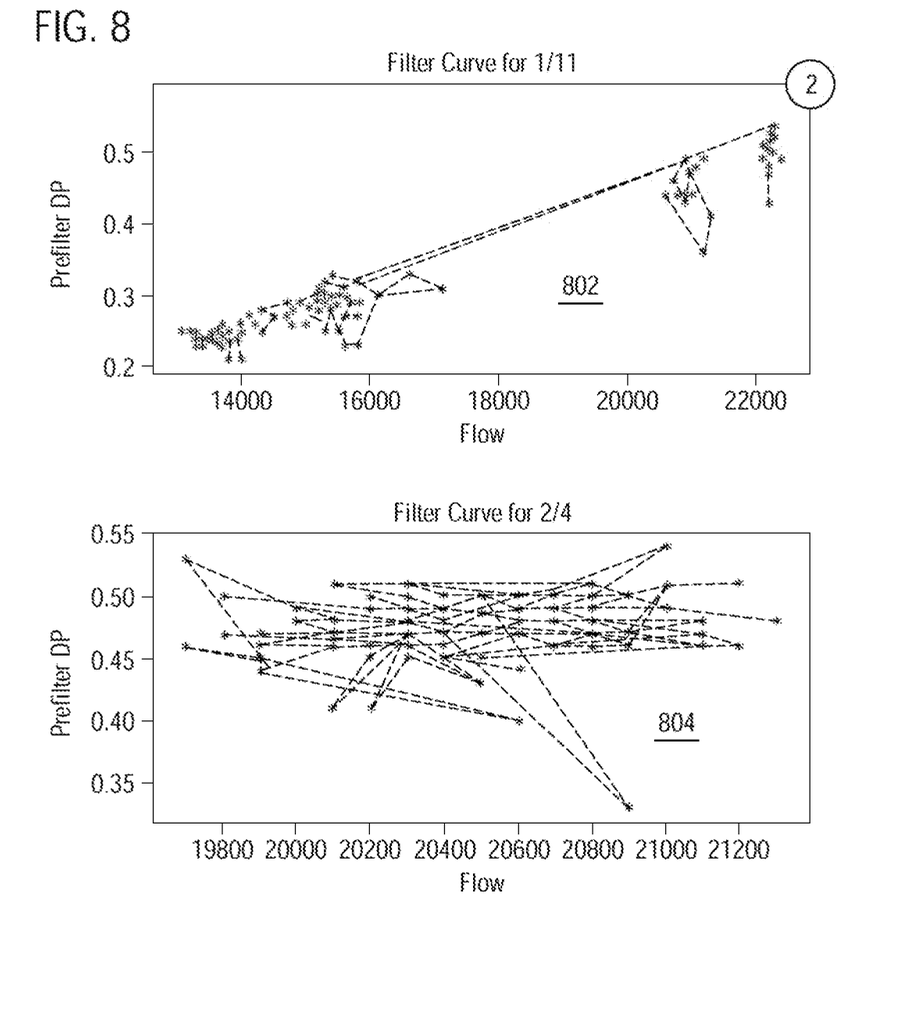
FIG. 8 is a graph of the filter curves from the data of FIG. 7 over one day in accordance with an example implementation of the inventions.

In FIG. 8, a graph of the filter curves 802 and 804 from the data of FIG. 7 over one day of measurements of airflow system 300 is shown in accordance with an example implementation of the inventions. Since the data is very noisy, it is not practical to detect the "dirty" level of a filter using only one day of data. The following data is associated with a filter having roughly the same dirty level, yet their filter curves are significantly different. Given the flow f and the DP value "d." If "d" is defined as:

$$d = \begin{bmatrix} d[1] \\ d[2] \\ \vdots \end{bmatrix}$$

and $$A = [1, f, f^2, f^3]$$

$f \in R^n$ is the flow vector defined as $$f = \begin{bmatrix} f[1] \\ f[2] \\ \vdots \end{bmatrix}$$

In other embodiment, the order of "A" can be higher or lower, such as $$A = [1, f]$$

$$A = [1, f, f^2]$$

or even $$A = [1, f, f^2, f^3, f^4].$$

In general, the more accurate flow meter, the better performance the higher-order models provide. Thus, $$d = A\ b,$$

where "b" is the unknown coefficient for the filter curve. But, "b" can be found using a least-squares regression method $$b = A^+ b,$$

And "$A^+$" is the pseudo-inverse of "A". The resulting filter curves 802 and 804 results.

Figure 9:
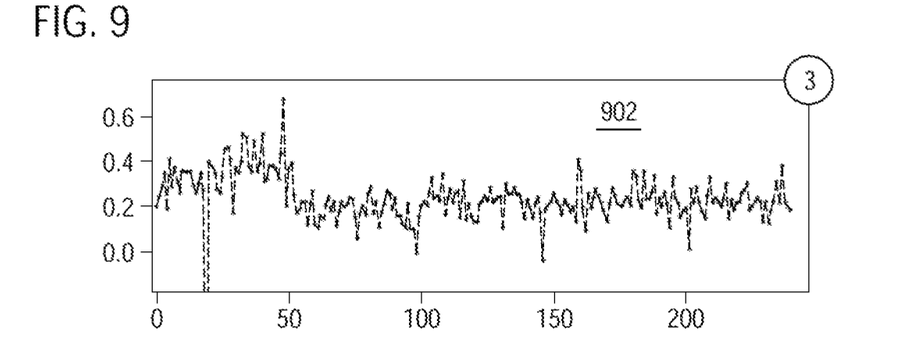
FIG. 9 is a graph of the multiday reference DP values after application a regression operation, such as a least-squares operation in accordance with an example implementation of the invention.

Turning to FIG. 9, a graph 902 of the multiday reference DP values after application a regression operation, such as a least-squares operation is depicted in accordance with an example implementation of the invention. Plot the all-time (one year in this example) daily filter parameters. The x-axis is the dates. The y-axis is the expected DP at the reference flow (18,000 cubic feet per minute in this example). As seen in graph 902, the data is very noisy, such that it is unclear how many and what filter replacement days are in the data set. For simplicity, the first-order filter curve model is used to illustrate the approach. Given d[i] the DP level for time instance i, we have the "d" vector with "M" elements:

$$d = \begin{bmatrix} d[1] \\ d[2] \\ \vdots \end{bmatrix}$$

The A matrix is redefined as:

$$A = \begin{bmatrix} 1 & 0 & 0 & \cdots & f \\ 0 & 1 & 0 & \cdots & f \\ 0 & 0 & 1 & \cdots & f \\ \vdots & \vdots & \vdots & \ddots & \vdots \\ 0 & 0 & 0 & \cdots & f \end{bmatrix}$$

and it is an M by (N+1) matrix, where N is the number of days. The dirty level of day j is represented as b[j], and the common slop of the filter curve is $b_0$ resulting in the following equation:

$$d = Ab$$

$$\begin{bmatrix} d[1] \\ d[2] \\ d[3] \\ \vdots \\ d[M] \end{bmatrix} = \begin{bmatrix} 1 & 0 & 0 & \cdots & f \\ 0 & 1 & 0 & \cdots & f \\ 0 & 0 & 1 & \cdots & f \\ \vdots & \vdots & \vdots & \ddots & \vdots \\ 0 & 0 & 0 & \cdots & f \end{bmatrix} \begin{bmatrix} b[1] \\ b[2] \\ \vdots \\ b[N] \\ b0 \end{bmatrix}$$

The "b" vector can be solved by the least-squares regression approach as well:

$$b = A^+ d$$

Resulting in the multiday reference DP values after one least square regression depicted in graph 902.

Figure 10:
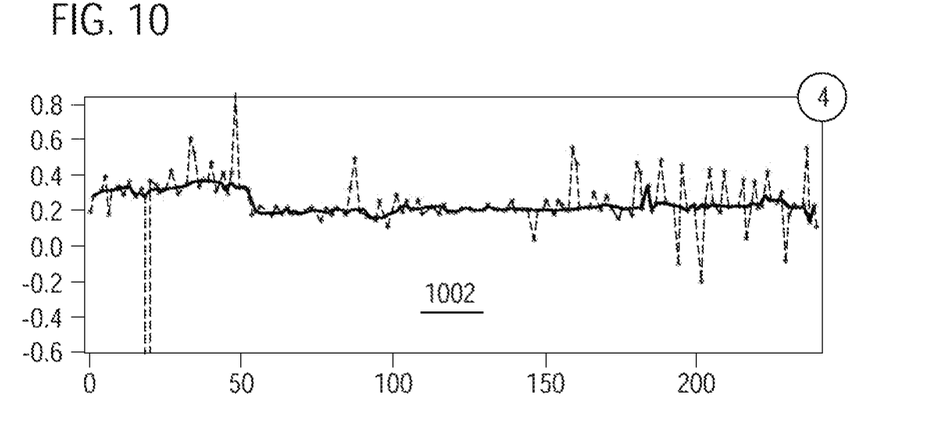
FIG. 10 is a graph of the multiday reference DP values after application of two least-squares operations in accordance with an example implementation of the invention.

In FIG. 10, a graph 1002 of the multiday reference DP values after application of two least-squares operations is depicted in accordance with an example implementation of the invention. The smoothed data with the least-squares method is shown in the dark solid line in graph 1002. The lighter line is the input without smoothing.

Figure 11:
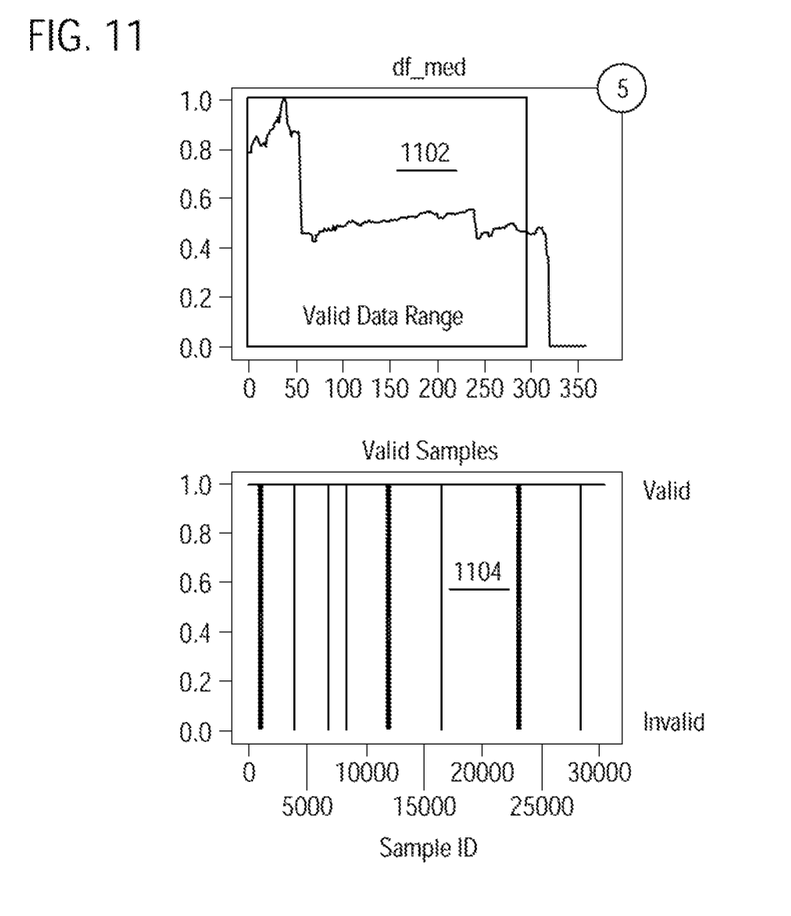
FIG. 11 is a graph of the multiday dirt level after considering fan status data in accordance with an example implementation of the invention.

Turning to FIG. 11, graphs 1102 and 1104 of the multiday dirt level after considering fan status data are shown in accordance with an example implementation of the invention. The dirtiness level (Df) is calculated and fan status applied to the calculation. The drop ramp up and ramp down time shown in graph 1102, there are two filter replacement events depicted during the year. It is noted that the second Df drop around day two hundred fifty is about the same significance as the drop on day fifty. If a window of two adjacent days is used, false alarms would occur and more than two filter replacement events detected.

Figure 12:
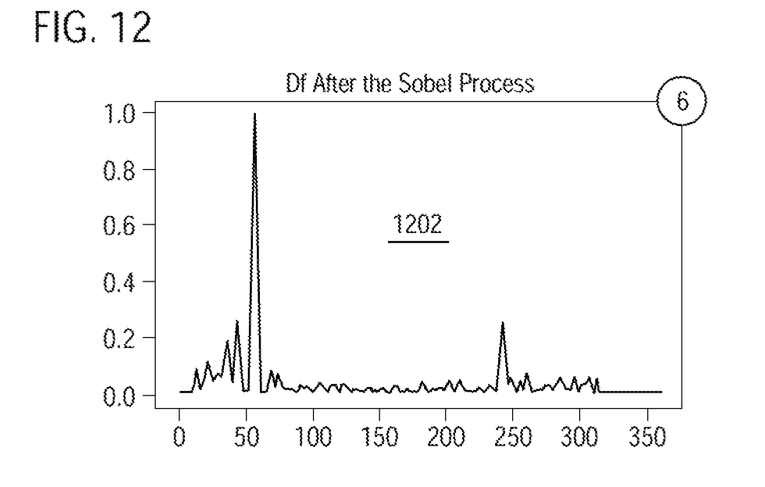
FIG. 12 is a graph of the dirt level after application of edge detection in accordance with an example implementation of the invention.

In FIG. 12, a graph 1202 of the dirt level after application of edge detection in is shown accordance with an example implementation. A Sobel filter (also called Sobel-Feldman operator) is employed for falling edge detection of the Df curve. In the current implementation, a Sobel filter is used. In other implementations a different edge detection approach may be employed, such as Canny, Prewitt, or Laplacian edge detection approach. The resulting peaks identify the filter replacement days.

Figure 13:
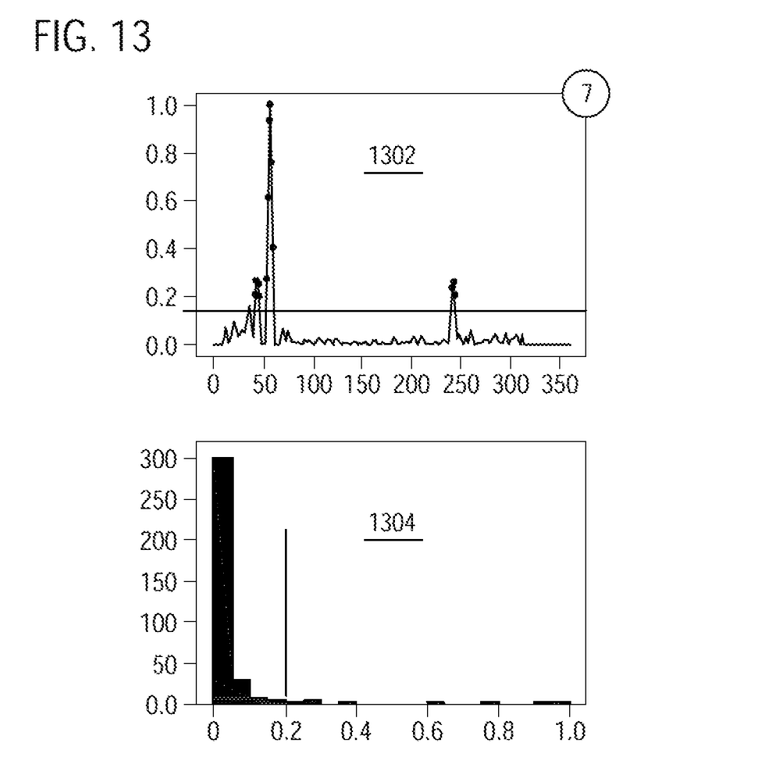
FIG. 13 depicts graphs of dynamic segmentation of the data of FIG. 11 in accordance with an example implementation of the invention.

Turning to FIG. 13, graphs 1302 and 1304 of dynamic segmentation of the data of FIG. 11 are shown in accordance with an example implementation. Dynamic segmentation is what allows multiple sets of attributes to be associated with any portion of a linear feature. Using the current data, peaks are clustered into segments. Using the standard deviation, the threshold is calculated for filter replacement. The points higher than the dynamic threshold are then selected. The selected points are identified as dots in graph 1302. Then the segment the points into two clusters that identify two filter replacement days.

Figure 14:
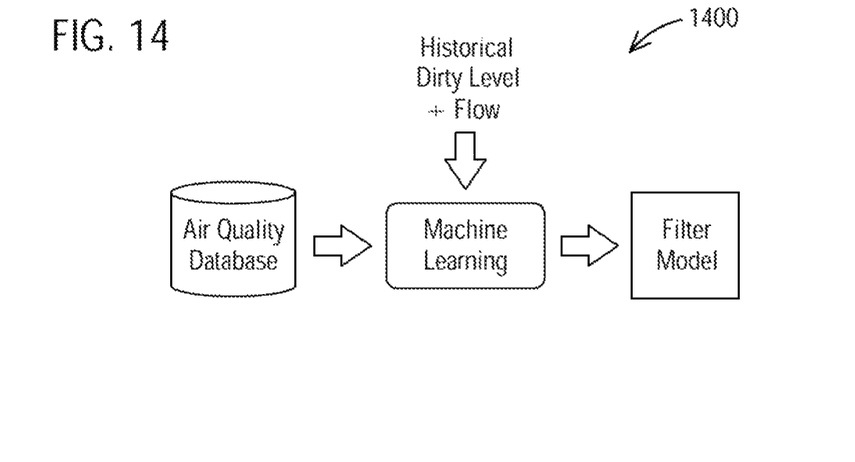
FIG. 14 is a diagram of a learning approach to identify the filter model in accordance with an example implementation of the invention.
Figure 15:
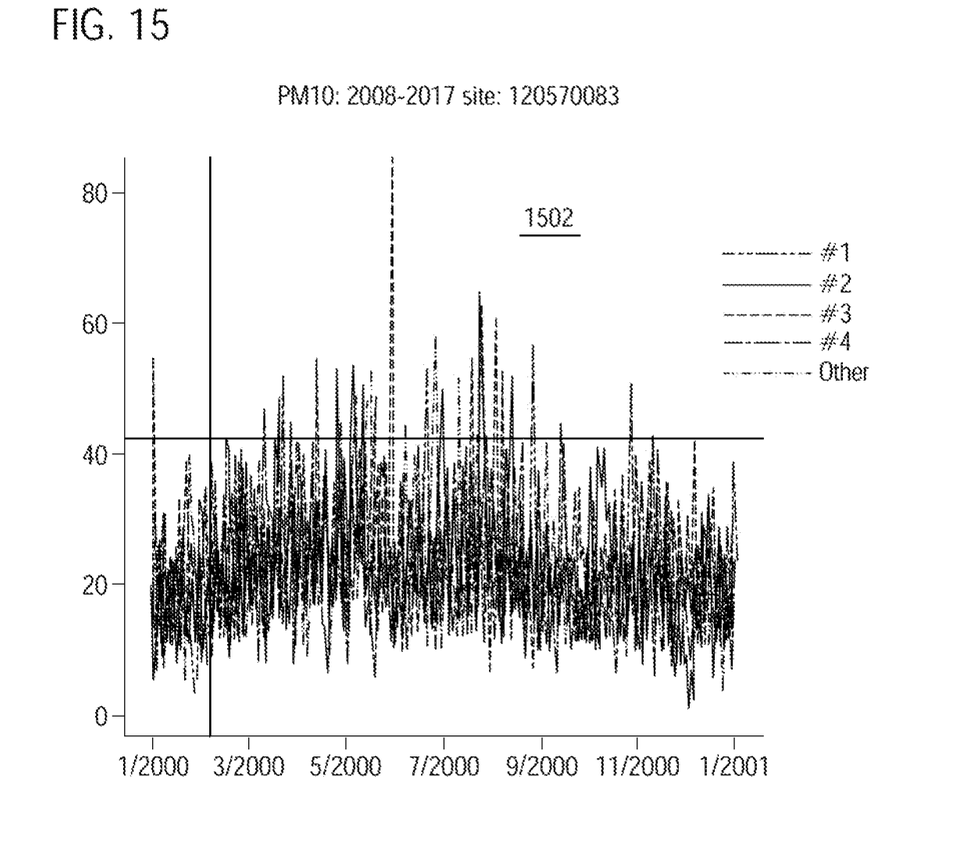
FIG. 15 is a graph of an example of daily air quality from several sample sites in a predetermined geographic region in accordance with an example implementation of the invention.

In FIG. 14, a diagram 1400 of a learning approach to identify the filter model is illustrated in accordance with an example implementation. The filter gets dirty when there are particles in the air capturable by the filter. If the filter dirty level is Df, the accumulation of the dirtiness is calculated by the following filter model.

$$D_f(t_N) = \int_{t_0}^{t_N} K d_A(t) f_P(t) dt$$

where $d_A(t)$ is the air dirtiness level on time t, which is associated with the Air Quality (AQ). The integration of airflow $f_F(t)$ multiplies $d_A(t)$ equals the total number of particles passing the filter from time $t_0$ to $t_N$. The constant k represents the capability for the filter to capture the particles. As shown in graph 1502, the parameter k is within the "filter model" box and will be learned based on the AQ database stored in the data store 212 or accessed via the network 106. Additionally, the relationship between individual air quality sensor data, such as Particle Matter 10 um (PM10), PM2.5, Pollen, etc., to the joint air dirty level ($d_A(t)$) can be identified via the machine learning process. Thus, the air quality database data is combined with the historical dirty level over a predetermined historical period and flow sensor data to generate a filter model.

Figure 16:
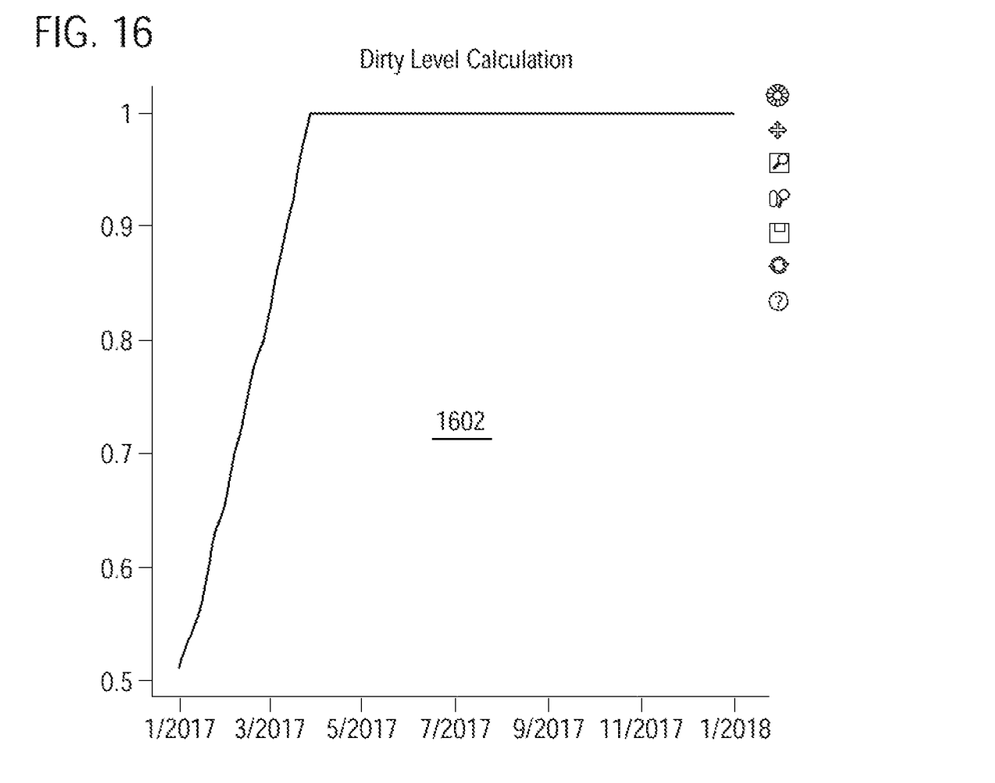
FIG. 16 is a graph of the estimated dirty level based on the data in accordance with an example implementation of the invention.

Turning to FIG. 15, a graph 1502 of an example of daily air quality from several sample sites in a predetermined geographic region is shown in accordance with an example implementation. Given the air quality metric, such as the daily PM10 example in FIG. 15, the dirty level accumulation speed can be estimated. In the current example, daily PM10 data from several locations and historical sensor data (DP and flow), the filter model can be built. In this case, given a filter type and the typical heating ventilation and air conditioning (HVAC) usage, the algorithm estimates that the filter dirty level increased from 0% to 100% in 4 months in graph 1602 (FIG. 16 is a graph of the estimated dirty level based on the data in accordance with an example implementation).

Figure 17:
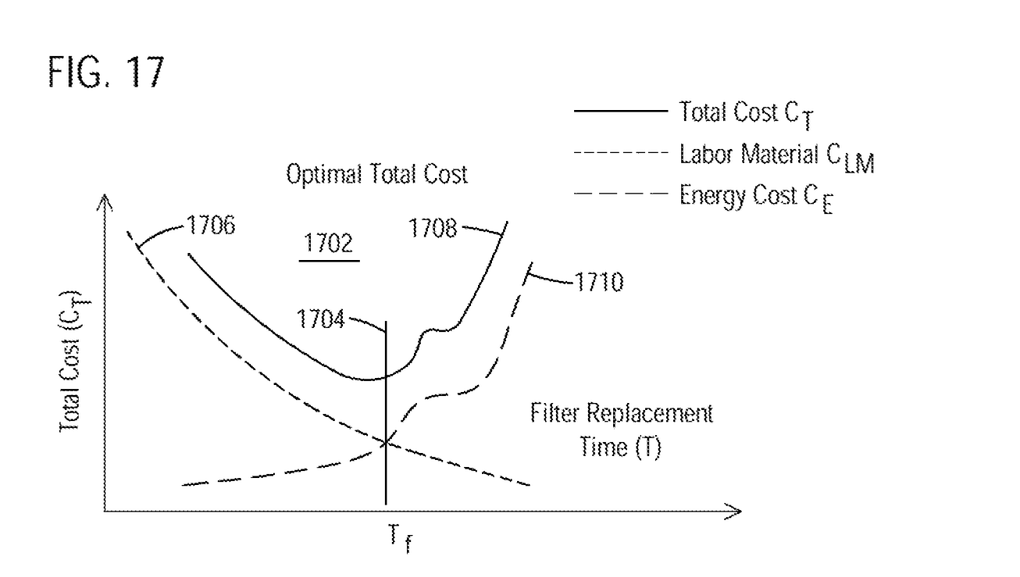
FIG. 17 is a graph of the optimal filter replacement date derived from the processed data in accordance with an example implementation of the invention.

In FIG. 17, a graph 1702 of the optimal filter replacement date derived from the processed data is illustrated in accordance with an example implementation. As filters get dirtier, the supply fan (i.e. centrifugal fan 318) will waste more energy to provide the same airflow. More frequent filter replacement will reduce fan energy waste yet demands more labor and hardware costs 1706. An optimal filter replacement frequency exists to minimize the total cost 1708. As illustrated in graph 1702, the vertical line 1704 on the time $T_f$ is the optimal filter replacement time.

To estimate the energy-saving potentials by replacing the filter, the fan speed is recorded after a new filter is just installed. The drive efficiency ratio R is defined as:

$R$=Fan Speed/Flow

For example, under the current dirty level, the R of the filter is R1 (i.e. air filter 320 of FIG. 3) is 4.2. When the filter was just installed, its ratio R2 is 3.39. Then the estimated energy saving ratio K is $K=(R2/R1)^3$ In the current example K=1.22, i.e., due to a dirty filter, there is 22% energy waste. Given energy price and the estimated supply fan energy consumption, we can estimate the energy savings by replacing the filter. This curve is shown as the Energy Cost curve 1710.

Figure 18:
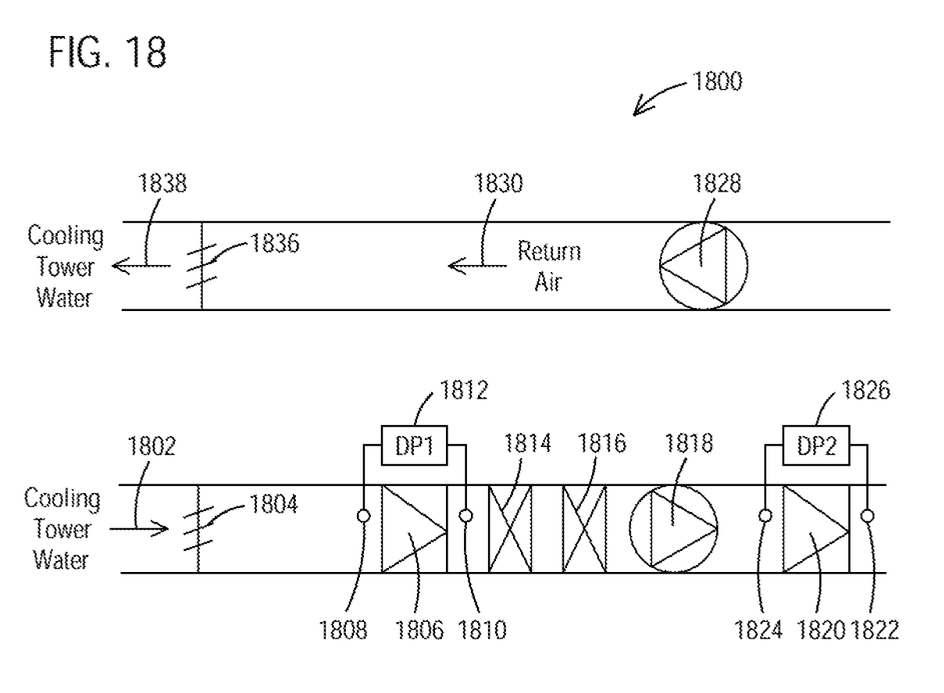
FIG. 18 is a diagram of a water flow system that is part of the building automation system of the building of FIG. 1 in accordance with an example implementation of the invention.

Turning to FIG. 18, a diagram 1800 of a water (liquid) flow system that is part of the building automation system 110 of the building 108 of FIG. 1 is depicted in accordance with an example implementation of the invention. Water tower water 1802 enters the building 108 and passes through valve 1804. A pressure sensor 1808 measures the flow or pressure of the water entering water filter 1806. The flow or pressure of water leaving the water filter 1806 is measured by the pressure sensor 1810. It is understood that the term pressure sensor and flow sensor are being used interchangeably. The drop in pressure DP1 1812 is determined and periodically sampled. The resulting data is sent to a data store for further processing, as differential pressure DP1 1812 is a sub-controller connected to the building controller 112. The water filter 1806 may be a pleated paper filter in the current implementation. In other implementations, other types of filters and filter material may be used such as fiberglass or sand.

The water from water filter 1806 passes through water coolers 1814 and 1816. A pump 1818 that increases the water pressure or flow past pressure sensor 1824 and then through water filter 1820 and pressure sensor 1822. The differential pressure DP2 sub-controller 1826 determines the pressure drop across the air filter and periodically provides the data to the data store for further processing. Additional data is generated by sensors associated with the centrifugal fan, such as the current draw and fan speed and also stored in the data store. Return water 1830 goes through pump 1828 through valve 1836 and the return water 1838 exits the building to the cooling tower. A similar approach as used with the airflow system 300 for determining the optimal filter replacement may be used by processing the sensor data from the water flow system 1800.

Figure 19:
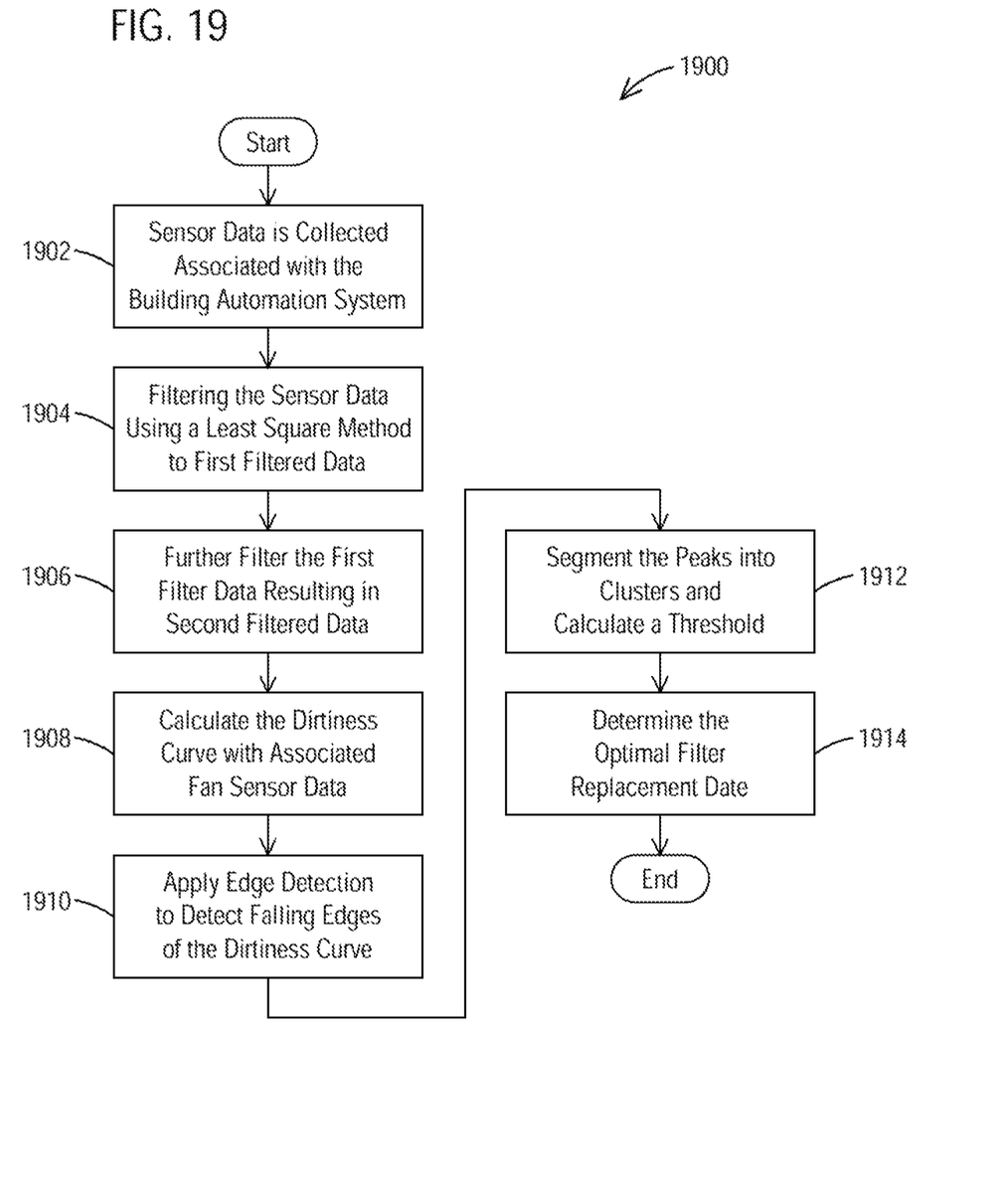
FIG. 19 is a flow diagram of an approach for determining when a filter needs to be replaced in accordance with an example implementation of the invention.

In FIG. 19 is a flow diagram 1900 of an approach for determining when a filter needs to be replaced in accordance with an example implementation of the invention. Sensor data is collected from sensors, such as 324 and 322 at a sub-controller DP2 326 associated with flow or pressure drops across a filter in step 1902 in a building automation system 110. In step 1904, the collected sensor data is processed by a master building controller 104 and in the current implementation, a numerical regression method, such as least squares, robust least squares, decision tree, support vector machine regression is employed to reduce the noise in the data. In step 1906, further filtering of the data results in a second filtered data set. The dirtiness curve is generated in step 1908. Edge detection filtering, such as using a Sobel filter, is applied to the dirtiness curve identifying the peak filter replacement days in step 1910 and resulting in edge detection filtered data. In step 1912, the peaks are segmented into clusters and a threshold is determined for filter replacement. Then using historic dirt data along with the processed data, labor and material cost, and energy cost, determine the optimal filter replacement date in step 1914.

It will be understood and is appreciated by persons skilled in the art, that one or more processes, sub-processes, or process steps described in connection with FIG. 19 may be performed by hardware and/or software (machine-readable instructions). If the approach is performed by software, the software may reside in software memory in a suitable electronic processing component or system such as one or more of the functional components or modules schematically depicted in the figures.

The software in software memory may include an ordered listing of executable instructions for implementing logical functions (that is, "logic" that may be implemented either in digital form such as digital circuitry or source code or in analog form such as analog circuitry or an analog source such an analog electrical, sound or video signal), and may selectively be embodied in any computer-readable medium for use by or in connection with an instruction execution system, apparatus, or device, such as a computer-based system, processor containing system, or other system that may selectively fetch the instructions from the instruction execution system, apparatus, or device and execute the instructions. In the context of this disclosure, a "computer-readable medium" is any tangible means that may contain or store the program for use by or in connection with the instruction execution system, apparatus, or device. The tangible computer-readable medium may selectively be, for example, but is not limited to, an electronic, magnetic, optical, electromagnetic, or semiconductor system, apparatus or device. More specific examples, but nonetheless a non-exhaustive list, of tangible computer-readable media would include the following: a portable computer diskette (magnetic), a RAM (electronic), a read-only memory "ROM" (electronic), an erasable programmable read-only memory (EPROM or Flash memory) (electronic) and a portable compact disc read-only memory "CDROM" (optical). Note that the tangible computer-readable medium may even be paper (punch cards or punch tape) or another suitable medium upon which the instructions may be electronically captured, then compiled, interpreted or otherwise processed in a suitable manner if necessary, and stored in computer memory.

The foregoing detailed description of one or more embodiments of the approach for middleware service for integrated building server that communicates directly with equipment, panels, and points has been presented herein by way of example only and not limitation. It will be recognized that there are advantages to certain individual features and functions described herein that may be obtained without incorporating other features and functions described herein. Moreover, it will be recognized that various alternatives, modifications, variations, or improvements of the above-disclosed embodiments and other features and functions, or alternatives thereof, may be desirably combined into many other different embodiments, systems or applications. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the embodiments contained herein.

What is claimed is:

1. A method for identification of a current filter dirty level, comprising:
    collecting differential pressure sensor data and flow data associated with a flow of materials through a physical filter;
    storing the differential pressure sensor data and flow data in a data store;
    filtering a predetermined set of the differential pressure sensor data and flow data to smooth the predetermine set of differential pressure sensor data that results in a first filtered data set;
    filtering the first filtered data set to further smooth the first filtered data that results in a second filtered data set;
    applying an edge detection filter to the second filter data set that results in an edge detection filtered data set; and
    determining a threshold for replacement of the physical filter and an optimal filter replacement date from with the edge detection filtered data set and the flow data.

2. The method for identification of the current filter dirty level of claim 1, includes:
    collecting energy sensor data associated with the flow of materials through the physical filter;
    storing the energy sensor data in the data store; and
    determining a threshold for replacement of the physical filter and an optimal filter replacement date from with the edge detection filtered data set and the energy sensor data.

3. The method for identification of the current filter dirty level of claim 1, where determining the optimal filter replacement date also uses historical outdoor air quality data.

4. The method for identification of the current filter dirty level of claim 1, where determining the optimal filter replacement date also uses historical filter dirty level.

5. The method for identification of the current filter dirty level of claim 1, where filtering the first filtered data is with a numerical regression method.

6. The method for identification of the current filter dirty level of claim 1, where applying the edge detection filter is applying the edge detection filter selected from a group consisting of Sobel, Canny, Prewitt, or Laplacian edge detection approach.

7. The method for identification of the current filter dirtiness level of claim 1, where the physical filter is an air filter.

8. The method for identification of the current filter dirtiness level of claim 1, where the physical filter is a liquid filter.

9. The method for identification of an optimal filter replacement date of claim 1, where determining the optimal filter replacement date, further includes using the energy sensor data.

10. The method for identification of an optimal filter replacement date of claim 1, where determining the optimal filter replacement date includes using a labor cost and a filter cost.

11. A system that identifies a current filter dirty level, comprising:
- a plurality of sensors coupled to a controller collecting differential pressure sensor data and flow data associated with a flow of materials through a physical filter;
- a data store accessed by a building controller that stores the differential pressure sensor data and flow data;
- a first filtered data set generated by a first filter method being applied by the controller to a portion of the differential pressure sensor data and flow data contained in the data store;
- a second filtered data set generated by a second filter method being applied by the controller to the first filtered data set to further smooth the first filtered data set;
- an edge detection filter applied by the controller to the second filtered data set by the controller resulting in edge detection filtered data set; and
- a threshold for filter replacement and an optimal filter replacement date determined by the controller from the edge detection filtered data set and flow data.

12. The system of claim 11, comprising:
energy sensor data collected energy sensors associated with the flow of materials through the physical filter, where the energy sensor data is stored in the data store; and
a threshold for replacement of the physical filter and an optimal filter replacement date are determined from with the edge detection filtered data set and the energy sensor data.

13. The system of claim 11, where the optimal filter replacement date determined by the controller also uses historical outdoor air quality data.

14. The system of claim 11, where the optimal filter replacement date determined by the controller also uses historical filter dirty level and flow data.

15. The system of claim 11, where the first filter method is a least square regression method.

16. The system of claim 11, where the second filter method is a least square regression method.

17. The system claim 11, where the edge detection filter is selected from a group consisting of a Sobel, Canny, Difference of Gaussian, Prewitt, Scharr, or Laplacian filter.

18. The system of claim 11, where the physical filter is an air filter.

19. The system of claim 11, where the physical filter is a liquid filter.

20. The system of claim 11, where determining the optimal filter replacement date, includes a predetermined historical period of data.

21. The system of claim 11, where determining the optimal filter replacement date, includes a labor cost and a filter cost being used when the optimal filter replacement data is determined.

* * * * *